(12) United States Patent
Luchesi De Almeida et al.

(10) Patent No.: US 10,646,811 B2
(45) Date of Patent: May 12, 2020

(54) AIR FILTER

(71) Applicants: Mahle Metal Leve S/A, Jundiai-Sp (BR); Mahle International GmbH, Stuttgart (DE)

(72) Inventors: Alexandre Luchesi De Almeida, Campinas-SP (BR); Edson Valdomiro De Azevedo, Jr., Jundiai-SP (BR); Pedro Basso, Santo Andre-SP (BR); Marcos Jose Dantas De Oliveira, Santo Andre-SP (BR)

(73) Assignees: Mahle International GmbH (DE); Mahle Metal Leve S/A (BR)

( * ) Notice: Subject to any disclaimer, the term of this patent is extended or adjusted under 35 U.S.C. 154(b) by 0 days.

(21) Appl. No.: 16/332,789

(22) PCT Filed: Sep. 15, 2016

(86) PCT No.: PCT/EP2016/071883
§ 371 (c)(1),
(2) Date: Mar. 12, 2019

(87) PCT Pub. No.: WO2018/050235
PCT Pub. Date: Mar. 22, 2018

(65) Prior Publication Data
US 2019/0209960 A1    Jul. 11, 2019

(51) Int. Cl.
*B01D 46/24* (2006.01)
*B01D 46/00* (2006.01)

(52) U.S. Cl.
CPC ..... *B01D 46/2414* (2013.01); *B01D 46/0005* (2013.01); *B01D 46/24* (2013.01); *B01D 46/2411* (2013.01); *B01D 2265/04* (2013.01); *B01D 2265/06* (2013.01); *B01D 2271/022* (2013.01); *B01D 2271/025* (2013.01); *B01D 2271/027* (2013.01); *B01D 2279/60* (2013.01)

(58) Field of Classification Search
CPC ............ B01D 46/2411; B01D 46/2414; B01D 2271/022; B01D 46/24; B01D 2271/025; B01D 2271/027; B01D 2265/04; B01D 2265/06; B01D 2279/60; B01D 46/0005
See application file for complete search history.

(56) References Cited

U.S. PATENT DOCUMENTS

| 6,086,763 | A  | 7/2000  | Baumann |
| 2012/0324849 | A1 | 12/2012 | Ackermann et al. |
| 2014/0325945 | A1 | 11/2014 | Coulonvaux et al. |
| 2015/0101299 | A1 | 4/2015  | Osendorf et al. |

FOREIGN PATENT DOCUMENTS

| EP | 2 544 793 A1 | 1/2013 |
| WO | 98/36817 A1 | 8/1998 |

*Primary Examiner* — Robert Clemente
(74) *Attorney, Agent, or Firm* — Fishman Stewart PLLC (57) ABSTRACT

An air filter for a fresh air system of an internal combustion engine may include a filter housing, a filter element, and an inner frame. The filter housing may include a housing pot, a housing lid, a raw air inlet, and a pure air outlet. The filter element may include an annular filter body, a first end plate, and a second end plate. The second end plate may include an annular first seal bearing sealingly against the housing pot, an annular second seal bearing sealingly against the inner frame, and at least one of at least one first annular web and at least one second annular web. The first seal may be coupled on a free end side of the at least one first annular web. The second seal may be coupled on a free end side of the at least one second annular web.

23 Claims, 4 Drawing Sheets

AIR FILTER

CROSS-REFERENCE TO RELATED APPLICATIONS

This application claims priority to International Application PCT/EP2016/071883, filed on Sep. 15, 2016, the contents of which are hereby incorporated by reference in its entirety.

TECHNICAL FIELD

The present invention relates to an air filter or an air filter device for a fresh air system of an internal combustion engine. Moreover, the invention relates to a filter element for an air filter of this type.

BACKGROUND

An air filter device or an air filter usually has a filter housing which has a housing pot with a pot bottom, a housing lid, a raw air inlet and a pure air outlet. The housing lid closes the housing pot axially opposite the pot bottom. Fresh air to be filtered is fed in via the raw air inlet. Filtered fresh air is discharged via the pure air outlet. Furthermore, an air filter usually comprises a filter element which has an annular filter body made from filter material, a first end plate which faces the housing lid on a first axial end side of the filter body, and a second end plate which faces the pot bottom on a second end side of the filter body. In the case of a filter body which is flowed through radially from the outside toward the inside, moreover, an inner frame can be provided which has an annular grid body which is arranged coaxially in the filter body. During operation of the air filter, a differential pressure which presses the filter body radially inward prevails on the filter body. Here, the filter body can be supported radially on the grid body of the inner frame. The grid body itself can be flowed through by the air flow and has no filter function in comparison with the filter body.

The filter element is arranged in the filter housing and, therein, usually separates a raw side which is connected fluidically to the raw air inlet from a pure side which is connected fluidically to the pure air outlet. In order to avoid leakages which bypass the filter body between the filter element and the filter housing, a seal is usually configured on one of the end plates, which seal bears against the filter housing.

WO 1998/36817 A1 has disclosed a filter element, in which a seal which is configured as a nonwoven seal is used on an end plate, which seal is welded to the end plate. A nonwoven seal consists of a nonwoven material, that is to say of fibers which are fixed to one another by way of felting. Here, plastic fibers are preferably used for nonwoven seals.

An air filter of the generic type is disclosed in US 2015/0 101 299 A1, wherein the second end plate has an annular first seal which bears sealingly against the housing pot, and wherein the second end plate has an annular second seal which bears sealingly against the inner frame.

Other air filters are known from US 2014/0 325 945 A1, EP 2 544 793 A1, and U.S. Pat. No. 6,086,763 A.

SUMMARY

The present invention is concerned with the problem of specifying an improved embodiment for an air filter of the above-described type, which improved embodiment is distinguished, in particular, by improved functionality and by an improved sealing action.

According to the invention, said problem is solved by way of the subject matter of the independent claim(s). Advantageous embodiments are the subject matter of the dependent claim(s).

The invention is based on the general concept of arranging two separate, annular seals on the second end plate of the filter element, namely a first seal and a second seal. The first seal seals with respect to the housing pot and to this end bears sealingly against the housing pot. The second seal seals with respect to the inner frame and to this end bears sealingly against the inner frame. In an alternative solution is provided an outlet stub fluidly connected to the pure air outlet and extending axially through a central opening of the second end plate. In this second solution the second seal seals with respect to the outlet stub and to this end bears sealingly against the outlet stub. As a result of the use of two separate seals which seal the filter element firstly with respect to the housing pot and secondly with respect to the inner frame, it is possible to design the inner frame as a separate component with regard to the filter element and with regard to the housing pot. The use of a separate inner frame, which preferably can be sealed with respect to the housing, makes it possible to manufacture a filter element without an integrated inner frame. As a result, the filter element can be manufactured less expensively. At the same time, the recycling of the filter element is simplified, since the inner frame is usually manufactured from a different plastic than the end plates and the filter body.

In accordance with one advantageous embodiment, the first seal bears radially, preferably exclusively radially, against the housing pot. The first seal therefore functions as a radial seal. The first seal which is configured as a radial seal permits axial movements between the filter element and the housing pot, which movements occur, for example, when the filter element is inserted into the housing pot. Alternatively, the first seal can be configured as an axial seal allowing radial play.

In addition or as an alternative, the second seal can bear radially, in particular exclusively radially, against the inner frame. To this extent, the second seal acts as a radial seal. The second seal which is configured as a radial seal permits axial movements between the filter element and the inner frame, which axial movements can occur, for example, when the filter element is inserted into the filter housing, that is to say when the filter element is placed onto the inner frame.

Another embodiment provides that the first seal is a nonwoven seal. In addition or as an alternative, the second seal can be a nonwoven seal. The respective nonwoven seal is preferably manufactured from a plastic material. Both nonwoven seals are expediently manufactured from the same plastic. It is of particular importance here that the seal which is configured as a nonwoven seal has a high similarity with regard to its material to the filter body which is manufactured from a filter material which can be manufactured from a similar plastic and, in particular, also from a nonwoven material. Said high material similarity simplifies the recycling of the filter element.

According to the invention, the first seal is fastened to the second end plate by way of welding or by way of plasticizing. In addition or as an alternative, the second seal is fastened to the second end plate by way of welding or by way of plasticizing. The welding and the plasticizing can be realized in a comparatively simple manner by way of the input of heat. During welding, both joining partners melt in the respective joining zone. During plasticizing, in contrast, only the one joining partner melts in the joining zone, it being possible for the melt of the melting joining partner to penetrate into the structure of the non-melting joining partner, as a result of which very efficient fixing can likewise be realized. During plasticizing of the respective seal which is configured as a nonwoven seal, the plastic of the second end plate melts and penetrates into the fiber structure of the nonwoven material in the joining zone.

Not according to the invention, alternative fastening possibilities for the first and/or second seal can be gluing, a heat stake process, clipping with an additional clipping element made of plastic or metal, and using a hook-and-loop fastener, wherein the hooks e.g. can be provided at the second end plate while the loops can be provided at the respective seal, in particular, when the respective seal is configured as a fleece seal, directly by the fleece material of the respective fleece such that the respective seal can be pressed onto the hooks. Another possibility can be providing the respective seal with a layer of another plastic material which can be better fastened to the material second end disc, e.g. in case the second end disc is made of relatively rigid PU.

According to the invention, the second end plate has at least one first annular web which projects axially and on the axially free end side of which the first seal is fastened thereto. In addition or as an alternative, the second end plate has at least one second annular web which projects axially and on the axially free end side of which the second seal is fastened thereto. A plurality of first annular webs and/or a plurality of second annular webs can also be provided depending on the radial dimension of the respective seal. The respective annular web produces a comparatively small contact zone, as a result of which the respective connection according to the invention is realized inexpensively by way of welding or by way of plasticizing.

The first seal can be arranged on the second end plate radially outside the second seal and coaxially with respect to the latter. In addition or as an alternative, the first seal can be arranged on the second end plate offset axially with respect to the second seal. By way of the abovementioned measures, the respective seal can be adapted with regard to its position in an optimum manner to the sealing zone which is provided on the housing pot or on the inner frame.

The first seal can advantageously be supported radially on a first annular step which is configured on the pot bottom. Here, the first seal expediently bears radially against the first annular step with a radially inwardly lying inner edge. The first annular step can be selected in an optimum manner with regard to geometry and position, in order for it to be possible to achieve a reliable sealing action.

The second seal can be supported radially on a second annular step which is configured on an annular collar of the inner frame, said annular collar projecting radially at a second axial end of the grid body which faces the pot bottom, and running around in the circumferential direction. The second annular step can also be positioned and/or designed here for an optimum sealing action.

According to another advantageous embodiment, the first seal and the second seal are arranged radially within a radially outwardly lying outer edge of the second end plate and radially outside a radially inwardly lying inner edge of the second end plate. Moreover, a first contact point, at which the first seal bears against the housing pot, and a second contact point, at which the second seal bears against the inner frame, can be arranged spaced apart axially from the filter body. If the abovementioned annular webs are used, said contact zones and therefore also the seals are spaced apart axially from the remaining second end plate. Said "remaining" second end plate is formed by a disk-shaped main body which is connected fixedly to the second axial end side of the filter body.

Another embodiment provides that the pure air outlet is configured on the pot bottom and has an outlet stub. The inner frame has a cylindrical sleeve at a second axial end of the grid body which faces the pot bottom, which cylindrical sleeve is plugged coaxially into the outlet stub. The abovementioned annular collar of the inner frame projects from said sleeve, which annular collar supports the second annular step. A sealing zone which is assigned to the second seal and in which the second seal bears against the inner frame therefore seals the pure side with respect to an intermediate space. A first sealing zone, in which the first seal bears against the housing pot, seals the raw side with respect to said intermediate space.

The second end plate can have an annular first centering web which projects axially, runs around in the circumferential direction along a radially outwardly lying outer edge of the first seal, and is radially adjacent with respect to the first seal. In addition or as an alternative, the second end plate can have an annular second centering web which projects axially, runs around in the circumferential direction along an outer edge of the second seal which lies radially on the outside, and is radially adjacent with respect to the second seal. The respective centering web simplifies the assembly of the filter element, since the centering web brings about a centering action of the respective seal during insertion of the respective seal, which facilitates the subsequent operation for fastening the seal to the second end plate.

According to a preferred embodiment the first seal has a ring-shaped middle area, a ring-shaped inner area and a ring-shaped outer area, wherein the middle area is coaxially arranged between the inner area and the outer area. The middle area is fastened to the second end plate and extends along a plane which extends perpendicular to the longitudinal center axis of the air filter. In the mounted state of the filter element, i.e. when the filter element is inserted into the filter housing, the outer area extends along a conus which extends coaxially to the longitudinal center axis, wherein the outer area bears sealingly against a conus-shaped contact zone of the pot bottom which extends coaxially to the longitudinal center axis. By means of this configuration the cooperation of the conus-shaped contact zone and the outer area improves positioning and in particular concentricity of the filter element within the filter housing.

Another embodiment proposes that the second end plate is provided with a conus-shaped support area which extends coaxially to the longitudinal center axis, wherein the outer area is in contact with the conus-shaped support area at a side turned away from the conus-shaped contact zone. With this support of the conus-shaped bent outer area the concentricity function of the cooperation between conus-shaped contact zone and outer area is improved.

Another embodiments suggests that the first seal is attached to the second end plate only in the middle area, wherein the inner area extends along a cylinder which extends coaxially to the longitudinal center axis, and wherein the inner area bears sealingly against a cylinder-shaped contact zone of the pot bottom which extends coaxially to the longitudinal center axis. With this suggestion a highly pre-stressed radial contact between the inner area and the cylinder-shaped contact zone can be provided. Such a pre-stressed contact improves the sealing function of the first seal with respect to the filter housing.

According to another embodiment the second end plate is provided with a cylinder-shaped support area which extends coaxially to the longitudinal center axis, wherein the inner area is in contact with the cylinder-shaped support area at a side turned away from the cylinder-shaped contact zone. With this support of the cylinder-shaped bent inner area the pre-stressed sealing function of the cooperation between cylinder-shaped contact zone and inner area is improved.

A filter element according to the invention is suitable for use in an air filter of the above-described type. In particular, a filter element of this type is distinguished by two separate seals on the second end plate.

In the present context, the axial direction, the radial direction and the circumferential direction of the air filter are related to the longitudinal center axis of the filter housing, which will be explained in detail further below in the description of the figures.

Further important features and advantages of the invention arise from the subclaims, from the drawings and from the associated description of the figures using the drawings.

It goes without saying that the features which are mentioned in the above text and are still to be described in the following text can be used not only in the respectively specified combination, but rather also in other combinations or on their own, without departing from the scope of the present invention.

Preferred exemplary embodiments of the invention are shown in the drawings and will be explained in greater detail in the following description, identical designations relating to identical or similar or functionally identical components.

BRIEF DESCRIPTION OF THE DRAWINGS

In the drawings, in each case diagrammatically.

DETAILED DESCRIPTION

Figure 1:
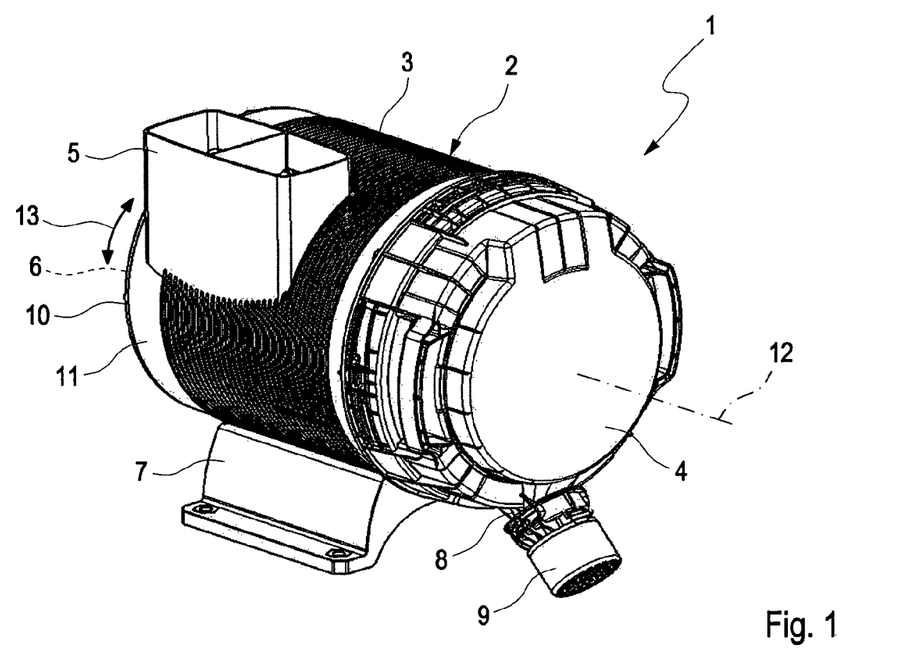
FIG. 1 shows an isometric view of an air filter.
Figure 2:
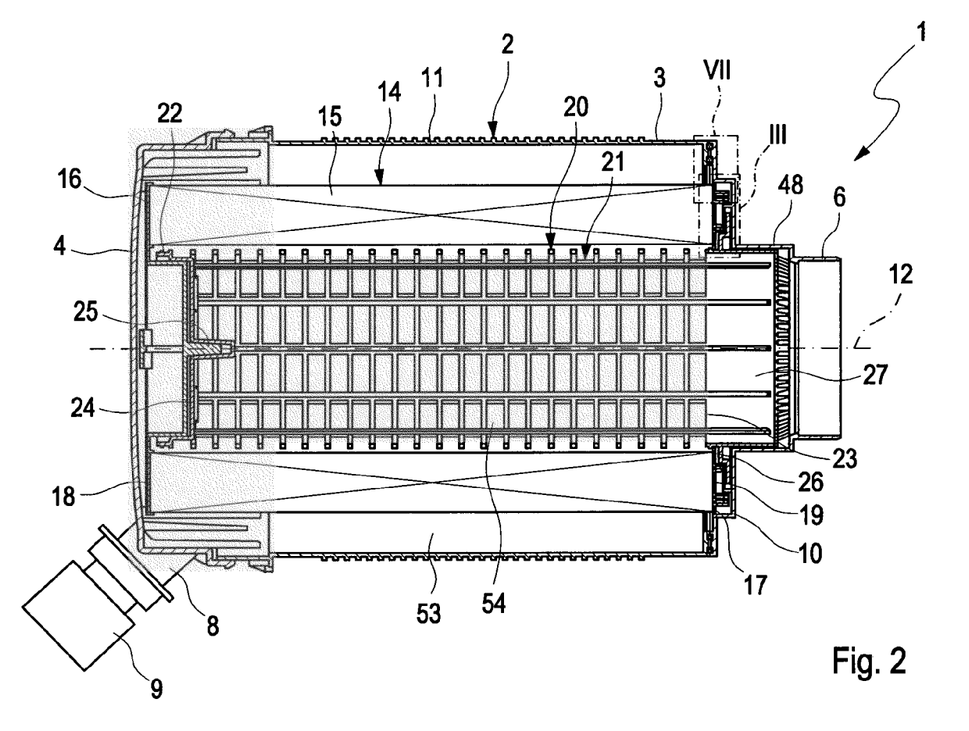
FIG. 2 shows a longitudinal section of the air filter.

In accordance with FIGS. 1 and 2, an air filter device 1 or an air filter 1 which is used in a fresh air system of an internal combustion engine comprises a filter housing 2 which has a housing pot 3, a housing lid 4, a raw air inlet 5 and a pure air outlet 6. Furthermore, a bracket 7 can be seen in FIG. 1, by way of which bracket 7 the filter housing 2 can be attached to a periphery of the internal combustion engine or of a vehicle which is equipped with the internal combustion engine. Furthermore, the filter housing 2 is equipped with a discharge stub 8, on which a discharge valve 9 is arranged. The housing pot 3 has a housing bottom 10 axially opposite the housing lid 4, and has a substantially cylindrical pot wall 11. The pot wall 11 defines a longitudinal center axis 12 of the air filter 1. The longitudinal center axis 12 for its part defines an axial direction of the air filter 1 which extends parallel to the longitudinal center axis 12. Furthermore, a radial direction of the air filter 1 extends transversely with respect to the axial direction. A circumferential direction 13 of the air filter 1 which is indicated by way of a double arrow in the figures rotates around the longitudinal center axis 12.

A filter element 14 is arranged in the interior of the filter housing 2, which filter element 14 has an annular filter body 15 and a first end plate 16 and a second end plate 17. In the installed state of the filter element 14, the first end plate 16 faces the housing lid 4 and is arranged here on a first axial end side 18 of the filter body 15. The second end plate 17 faces the pot bottom 10 and is attached on a second axial end side 19 of the filter body 15. The respective end plate 16, 17 is expediently connected fixedly to the filter body 15 by way of welding or by way of plasticizing; it can also be foamed or injection molded or glued onto the filter body 15.

In the interior of the filter housing 2, the filter element 14 separates a raw side 53 which is connected fluidically to the raw air inlet 5 from a pure side 54 which is situated here in the interior of the filter element 15 and which is connected fluidically to the pure air outlet 6. The raw side 53 is situated in the filter housing 2 outside the filter element 14.

According to FIG. 2, moreover, the air filter 1 has an inner frame 20 which has an annular grid body 21 which is arranged coaxially in the filter body 14. The inner frame 20 is designed as a separate component with regard to the filter housing 2 and with regard to the filter element 14. The grid body 21 has a first axial end 22 which faces the housing lid 4 and a second axial end 23 which faces the pot bottom 10. At the first axial end 22, the inner frame 20 has an end bottom 24 which interacts via a torque coupling 25 with the first end plate 16 for the transmission of torque. At the second axial end 23, the inner frame 20 has an annular collar 26 which projects radially and runs around in the circumferential direction 13. Furthermore, the inner frame 20 has a cylindrical sleeve 27 at the second axial end 23. This cylindrical sleeve 27 is fluid-tight.

According to FIGS. 3 to 6, the filter element 14 has an annular first seal 28 on the second end plate 17, which first seal 28 bears sealingly against the housing pot 3, in particular against the pot bottom 10 of the housing pot 3. Moreover, there is an annular second seal 29 on the second end plate 17, which second seal 29 bears sealingly against the inner frame 20. The second end plate 17 is configured as an open end plate and accordingly has a central through opening 30, through which the inner frame 20 can be introduced axially into the interior of the filter body 15. In contrast to this, the first end plate 16 is expediently configured as a closed end plate, with the result that a seal can in principle be dispensed with in the region of the first end plate 16.

In the case of the examples which are shown here, the first seal 28 and the second seal 29 are designed in each case as exclusively radially sealing or exclusively radially acting seals, with the result that the first seal 28 bears only radially against the housing pot 3 or against its pot bottom 10, whereas the second seal 29 bears only radially against the inner frame 20. It is provided, moreover, that both seals 28, 29 are configured in each case as nonwoven seals which consist of a plastic nonwoven. A corresponding first contact zone, with which the first seal 28 bears radially against the housing pot 3 or against the pot bottom 10, is denoted by 31. A corresponding second contact zone, in which the second seal 29 bears radially against the inner frame 20, is denoted by 33.

The two seals 28 are preferably fastened to the second end plate 17 in each case via at least one melted connection 34. Here, the respective melted connection 34 can be produced by way of welding or by way of plasticizing.

For the axial positioning of the first seal 28, the second end plate 17 has two first annular webs 35 which project in each case axially from a planar main body 36 of the second end plate 17 and run around in the circumferential direction 13. Said main body 36 of the second end plate 17 is annular and is connected fixedly to the filter body 15 on the second axial end side 19. Here, the first seal 28 is arranged on the free end sides which are remote from the main body 36 of the two first annular webs 35. In particular, the melted connections 34 are situated on said free end sides. For the axial positioning of the second seal 29, the second end plate 17 is provided with a second annular web 37 which projects axially from the main body 36. The second annular seal 29 is arranged on a free end side which is remote from the main body 36 of the second annular web 37. The melted connection 34 is expediently configured on the end side of the second annular web 37.

The two seals 28, 29 are arranged on the second end plate 17 offset axially with respect to one another. This is achieved by way of different axial dimensions of the annular webs 35, 37. In the example, the second seal 29 lies closer to the main body 36 than the first seal 28. Furthermore, the two seals 28, 29 are situated on different radii with respect to the longitudinal center axis 12, but are arranged coaxially with respect to one another. The first seal 28 is situated radially outside the second seal 29. Furthermore, it is provided here that the two seals 28, 29 are arranged spaced apart radially from an inner edge 55 of the second end plate 17 or of its main body 36 and spaced apart radially from an outer edge 56 of the main body 36 or of the second end plate 17.

Figure 6:
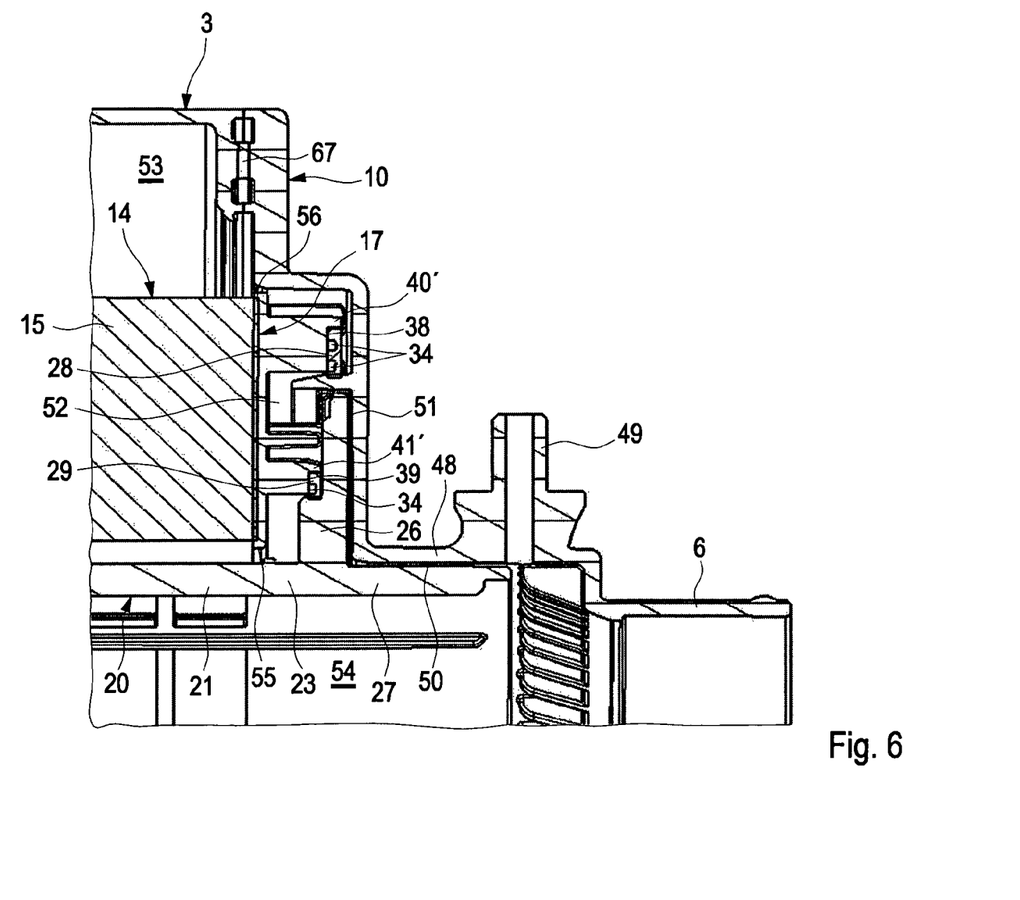
FIG. 6 shows a sectional view as in FIG. 3, but in the case of a different embodiment.

In the alternative embodiment which is shown in FIG. 6, the seals 28, 29 are not positioned axially with respect to the main body 36 via annular webs 35, 37 of this type, but rather via large-area shoulders, namely via a first annular shoulder 38 for axial positioning of the first seal 28 and a second annular shoulder 39 for axial positioning of the second seal 29. Here, the melting zones 34 are realized in the region of said shoulders 38, 39.

Figure 3:
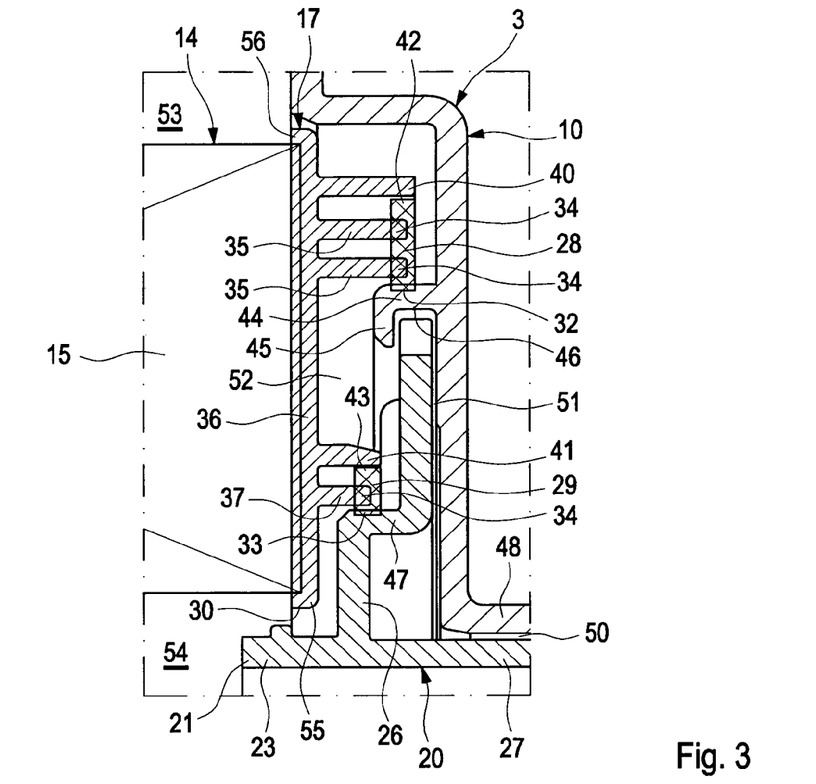
FIG. 3 shows an enlarged detail III from FIG. 2.
Figure 4:
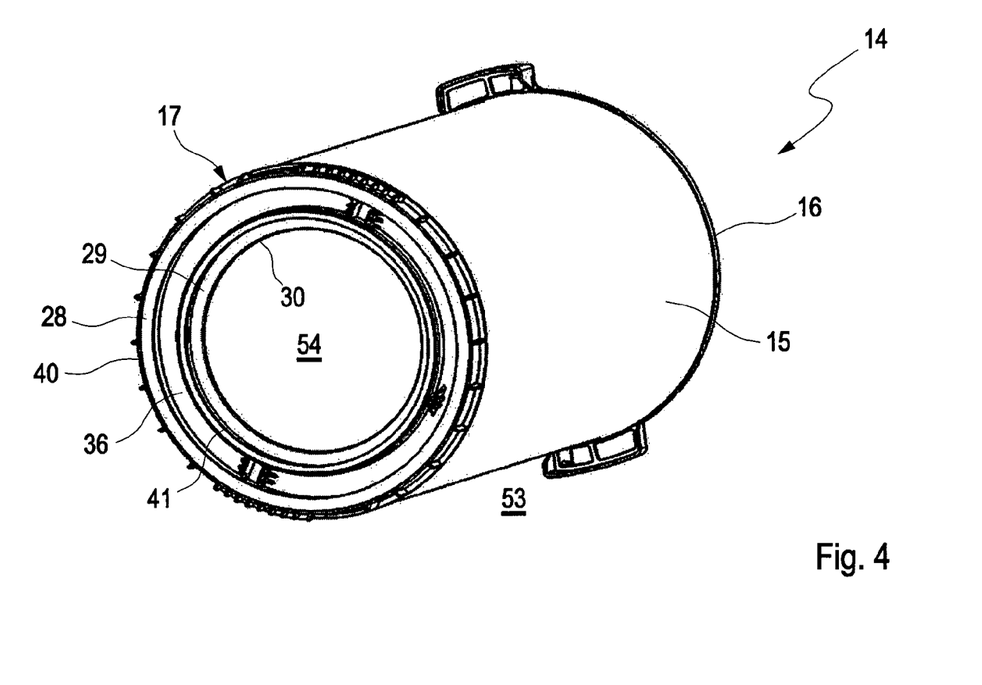
FIG. 4 shows an isometric view of a filter element.
Figure 5:
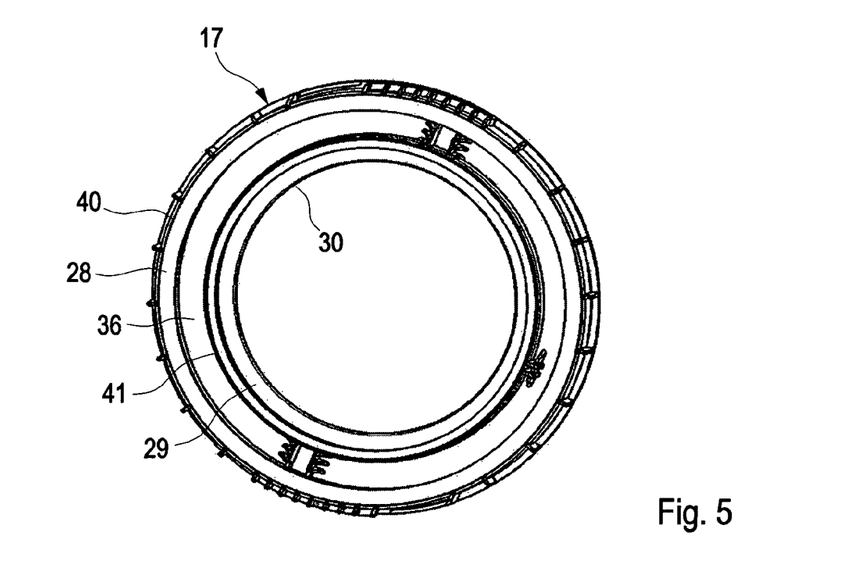
FIG. 5 shows an isometric view of an end plate of the filter element.

According to FIGS. 3 to 5, moreover, the second end plate 17 has an annular first centering web 40 and an annular second centering web 41. In said embodiment, the respective centering web 40, 41 projects axially from the main body 36 and expediently runs around in the circumferential direction 13. Here, the first centering web 40 runs around along a radially outwardly lying outer edge 42 of the first seal 28 and is radially adjacent with respect to said outer edge 42. The second centering web 41 runs around along a radially outwardly lying outer edge 43 of the second seal 29 and is radially adjacent with respect thereto. During the mounting of the seals 28, 29 on the second end plate 17, the centering webs 40, 41 bring about a centering action and radial positioning of the respective seal 28, 29, which simplifies its mounting considerably. In the example of FIG. 6, the centering webs 40, 41 are formed by way of steps in the shoulders 38, 39 and are denoted by 40' for the first centering web and 41' for the second centering web. In this case, the centering webs 40' and 41' do not project from the main body 36, but rather from the respective shoulder 38 and 39, respectively.

According to FIGS. 3 and 6, the first seal 28 is supported radially on a first annular step 44 which is configured on the pot bottom 10. In the example of FIG. 3 which is shown, moreover, the first annular step 44 has a radially projecting collar 45, as a result of which a radial groove 46 is configured radially within the first annular step 44. The second seal 29 is supported on a second annular step 47 which is configured on the annular collar 26 of the inner frame 20. In the example of FIG. 3, the annular collar 26 protrudes radially at its radially outwardly lying end into the abovementioned radial groove 46.

According to FIGS. 2, 3 and 6, the pot bottom 10 has an outlet stub 48 which forms a constituent part of the pure air outlet 6. The abovementioned sleeve 27 of the inner frame 20 protrudes coaxially into the outlet stub 48. In the example of FIG. 6, a connection point 49 is formed integrally on said outlet stub 48. Via the connection point 49, for example, a sensor can be arranged, for example a temperature sensor or a pressure sensor. It is likewise conceivable to remove a small part of the cleaned fresh air via the connection point 49 or to feed in a gas to the fresh air. For example, secondary air can be removed or blow-by gas can be fed into the fresh air via the connection point 49. The sleeve 27 of the inner frame 20 is preferably sealed with respect to the outlet stub 48.

An axial annular gap 50 which develops a certain sealing action can be configured radially between the sleeve 27 and the outlet stub 28. To this extent, the axial annular gap 50 can act as a gap seal. Furthermore, according to FIG. 6, a radial annular gap 51 which can likewise have a certain sealing action in the manner of a gap seal can be configured axially between the pot bottom 10 and the annular collar 26. In any case, an intermediate space 52 which is configured axially between the second end plate 17 and the pot bottom 10 communicates through the radial annular gap 51 and through the axial annular gap 50 with the pure side 54. The first seal 28 seals the intermediate space 52 with respect to the raw side 53. The second seal 29 seals the intermediate space 52 with respect to the pure side 54.

Figure 7:
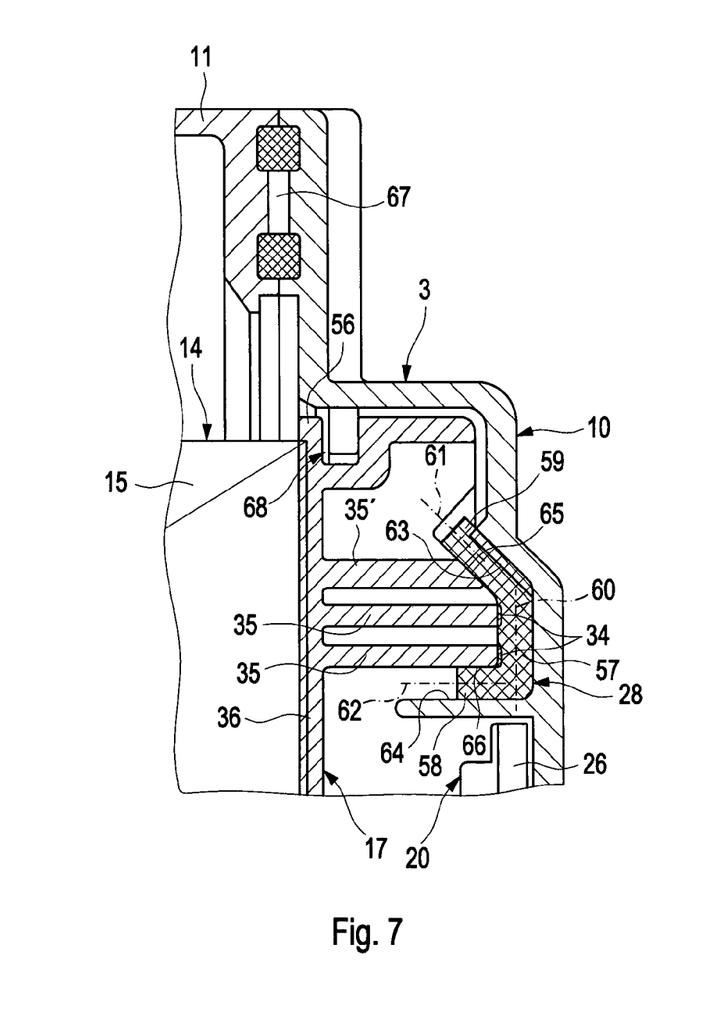
FIG. 7 shows an enlarged detail VII from FIG. 2 of another embodiment with a portion of a filter housing.
Figure 8:
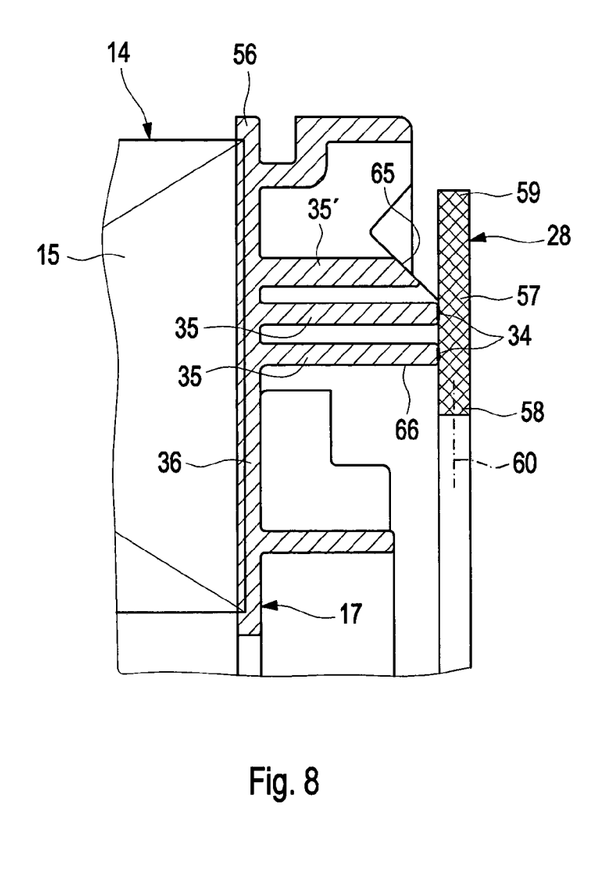
FIG. 8 shows the detail of FIG. 7 but without the filter housing.

FIGS. 7 and 8 show another embodiment of the air filter 1 with a modified filter housing 2 and an accordingly modified filter element 14. The first seal 28 is formed from a ring-shaped middle area 57, a ring-shaped inner area 58 and a ring-shaped outer area 59. The middle area 57 is coaxially arranged between the inner area 58 and the outer area 59. FIG. 8 depicts the non-mounted state in which the filter element 14 is not inserted into the filter housing 2. Therefore, in FIG. 8 the first seal 28 is stress-free and lies completely with all three areas in a plane 60 which extend perpendicular to the longitudinal center axis 12. FIG. 7 depicts the mounted state in which the filter element 14 is inserted into the filter housing 2. Therefore, the first seal 28 is stressed and at least partially and elastically deformed. The middle area 58 is fastened to the second end plate 17. The middle area 57 extends along the plane 60. The outer area 59 extends in the mounted state of FIG. 7 along a conus 62 which extends coaxially to the longitudinal center axis 12. Furthermore, the outer area 59 bears sealingly against a conus-shaped contact zone 63 of the pot bottom 10 which extends coaxially to the longitudinal center axis 12. Additionally, the second end plate 17 is provided with a conus-shaped support area 65 which extends coaxially to the longitudinal center axis 12, wherein the outer area 59 is in contact with the conus-shaped support area 65 at a side turned away from the conus-shaped contact zone 63. This conus-shaped support area 65 is provided in the area of an additional third annular web 35' to which the first seal 28 is not fastened, at least in this embodiment.

Preferably, the first seal 28 is attached to the second end plate 17 only in the middle area 57. So the melted connections 34 can only be found at the two other annular webs 35. Additionally, the inner area 58 extends along a cylinder 62 which extends coaxially to the longitudinal center axis, wherein the inner area 58 bears sealingly against a cylinder-shaped contact zone 64 of the pot bottom 10 which extends coaxially to the longitudinal center axis 12. Furthermore, the second end plate 17 can be provided with a cylinder-shaped support area 66 which extends coaxially to the longitudinal center axis 12, wherein the inner area 58 is in contact with the cylinder-shaped support area 66 at a side turned away from the cylinder-shaped contact zone 64.

As can be seen in FIGS. 6 and 7 the pot bottom 10 and the pot wall 11 can be separate parts which are welded together. A ring-shaped welding zone is depicted with 67. In FIG. 7 also a portion of a bayonet fitting 68 can be recognized. Such a bayonet fitting 68 can be used to axially fix the second end plate 17 to the pot bottom 10 in the mounted state.

The invention claimed is:

1. An air filter for a fresh air system of an internal combustion engine, comprising:
   a filter housing including a housing pot with a pot bottom, a housing lid, a raw air inlet, and a pure air outlet;
   a filter element including an annular filter body composed of a filter material, a first end plate which faces the housing lid disposed on a first axial end side of the filter body, and a second end plate which faces the pot bottom disposed on a second axial end side of the filter body;
   an inner frame including an annular grid body arranged coaxially in the filter body;
   the second end plate including an annular first seal bearing sealingly against the housing pot;
   the second end plate further including an annular second seal bearing sealingly against the inner frame;
   wherein the second end plate further includes at least one of:
      at least one first annular web projecting axially therefrom, wherein on a free end side of the at least one first annular web the first seal is coupled thereto via one of welding and plasticizing; and
      at least one second annular web projecting axially therefrom, wherein on a free end side of the at least one second annular web the second seal is coupled thereto via one of welding and plasticizing.

2. The air filter as claimed in claim 1, wherein at least one of:
   the first seal bears radially against the housing pot; and
   the second seal bears radially against the inner frame.

3. The air filter as claimed in claim 1, wherein at least one of:
   the first seal is a nonwoven seal; and
   the second seal is a nonwoven seal.

4. The air filter as claimed in claim 1, wherein at least one of:
   the first seal is coupled to the second end plate via one of welding and plasticizing; and
   the second seal is coupled to the second end plate via one of welding and plasticizing.

5. The air filter as claimed in claim 1, wherein the first seal is arranged on the second end plate radially outside the second seal and coaxially with respect to the second seal.

6. The air filter as claimed in claim 1, wherein the first seal is arranged on the second end plate offset axially with respect to the second seal.

7. The air filter as claimed in claim 1, wherein the first seal and the second seal are arranged radially to an outside of an inner edge of the second end plate and radially to an inside of an outer edge of the second end plate.

8. The air filter as claimed in claim 1, wherein:
   the first seal is arranged on the second end plate radially outside the second seal and coaxially with respect to the second seal;
   the first seal is arranged on the second end plate offset axially with respect to the second seal; and
   the first seal and the second seal are arranged spaced apart radially to an outside from an inner edge of the second end plate and are spaced apart radially to an inside from an outer edge of the second end plate.

9. The air filter as claimed in claim 1, wherein the first seal is supported radially on a first annular step disposed on the pot bottom.

10. The air filter as claimed in claim 1, wherein:
    the pure air outlet is disposed on the pot bottom and includes an outlet stub; and
    the inner frame includes a cylindrical sleeve disposed at an axial end of the grid body facing the pot bottom, the cylindrical sleeve plugged coaxially into the outlet stub.

11. The air filter as claimed in claim 1, wherein the second end plate includes an annular first centering web projecting axially therefrom, extending in a circumferential direction along an outer edge of the first seal which lies radially on an outside of the first seal, and disposed radially adjacent to the first seal.

12. The air filter as claimed in claim 1, wherein the second end plate has an annular second centering web projecting axially therefrom, extending in a circumferential direction along an outer edge of the second seal which lies radially on an outside of the second seal, and disposed radially adjacent to the second seal.

13. The air filter as claimed in claim 1, wherein:
    the at least one of the at least one first annular web and the at least one second annular web includes the at least one first annular web and the at least one second annular web;
    the second end plate includes an annular first centering web projecting axially therefrom, extending in a circumferential direction along an outer edge of the first seal which lies radially on an outside of the first seal, and disposed radially adjacent to the first seal; and
    the second end plate includes an annular second centering web projecting axially therefrom, extending in the circumferential direction along an outer edge of the second seal which lies radially on an outside of the second seal, and disposed radially adjacent to the second seal.

14. The air filter as claimed in claim 13, wherein:
    the first seal is arranged on the second end plate radially outside the second seal and coaxially with respect to the second seal;
    the first seal is arranged on the second end plate offset axially with respect to the second seal;
    the first seal and the second seal are arranged spaced apart radially to an outside from an inner edge of the second end plate and are spaced apart radially to an inside from an outer edge of the second end plate; and
    the first seal and the second seal are nonwoven seals and coupled to the second end plate via one of welding and plasticizing.

15. The air filter as claimed in claim 1, wherein:
    the first seal has a ring-shaped middle area, a ring-shaped inner area, and a ring-shaped outer area;
    the middle area is coaxially arranged between the inner area and the outer area;
    the middle area is coupled to the second end plate;
    the middle area extends along a plane which extends perpendicular to a longitudinal center axis of the air filter;

the outer area extends along a conus extending coaxially to the longitudinal center axis; and the outer area bears sealingly against a conus-shaped contact zone of the pot bottom extending coaxially to the longitudinal center axis.

16. The air filter as claimed in claim 15, wherein:

the second end plate has a conus-shaped support area extending coaxially to the longitudinal center axis; and the outer area is in contact with the conus-shaped support area at a side turned away from the conus-shaped contact zone.

17. The air filter as claimed in claim 15, wherein:

the first seal is attached to the second end plate only in the middle area;

the inner area extends along a cylinder extending coaxially to the longitudinal center axis; and the inner area bears sealingly against a cylinder-shaped contact zone of the pot bottom extending coaxially to the longitudinal center axis.

18. The air filter as claimed in claim 17, wherein:

the second end plate has a cylinder-shaped support area extending coaxially to the longitudinal center axis; and the inner area is in contact with the cylinder-shaped support area at a side turned away from the cylinder-shaped contact zone.

19. The air filter as claimed in claim 1, wherein at least one of:

the at least one of the at least one first annular web and the at least one second annular web includes the at least one first annular web, and the free end side of the at least one first annular web is disposed at least partially within the first seal; and the at least one of the at least one first annular web and the at least one second annular web includes the at least one second annular web, and the free end side of the at least one second annular web is disposed at least partially within the second seal.

20. The air filter as claimed in claim 1, wherein at least one of:

the at least one of the at least one first annular web and the at least one second annular web includes the at least one first annular web, the at least one first annular web includes a plurality of first annular webs disposed radially spaced apart from one another, and each of the plurality of first annular webs is coupled to the first seal at a respective free end side; and the at least one of the at least one first annular web and the at least one second annular web includes the at least one second annular web, the at least one second annular web includes a plurality of second annular webs disposed radially spaced apart from one another, and each of the plurality of second annular webs is coupled to the second seal at a respective free end side.

21. An air filter for a fresh air system of an internal combustion engine, comprising:

a filter housing including a housing pot with a pot bottom, a housing lid, a raw air inlet, and a pure air outlet;

a filter element including an annular filter body composed of a filter material, a first end plate which faces the housing lid disposed on a first axial end side of the filter body, and a second end plate which faces the pot bottom disposed on a second axial end side of the filter body;

an inner frame including an annular grid body arranged coaxially in the filter body;

wherein the second end plate includes:

an annular first seal bearing sealingly against the housing pot;

an annular second seal bearing sealingly against the inner frame;

at least one first annular web projecting axially therefrom, a free end side of the at least one first annular web coupled to the first seal via one of welding and plasticizing; and at least one second annular web projecting axially therefrom, a free end side of the at least one second annular web coupled to the second seal via one of welding and plasticizing.

22. The air filter as claimed in claim 21, wherein:

the at least one first annular web includes a plurality of first annular webs disposed radially spaced apart from one another; and each of the plurality of first annular webs is coupled to the first seal at a respective free end side.

23. An air filter for a fresh air system of an internal combustion engine, comprising:

a filter housing including a housing pot with a pot bottom, a housing lid, a raw air inlet, and a pure air outlet;

a filter element including an annular filter body composed of a filter material, a first end plate which faces the housing lid disposed on a first axial end side of the filter body, and a second end plate which faces the pot bottom disposed on a second axial end side of the filter body;

an inner frame including an annular grid body arranged coaxially in the filter body;

the second end plate including an annular first seal bearing sealingly against the housing pot;

the second end plate further including an annular second seal bearing sealingly against the inner frame;

wherein the second seal is supported radially on an annular step disposed on an annular collar of the inner frame, the annular collar projecting radially from an axial end of the grid body facing the pot bottom and extending in a circumferential direction;

wherein the second end plate further includes at least one of:

at least one first annular web projecting axially therefrom, a free end side of the at least one first annular web coupled to the first seal via one of welding and plasticizing; and at least one second annular web projecting axially therefrom, a free end side of the at least one second annular web coupled to the second seal via one of welding and plasticizing.

* * * * *